Oct. 12, 1926.  G. WALTHER ET AL  1,602,512
WHEEL
Filed March 19, 1923   5 Sheets-Sheet 2
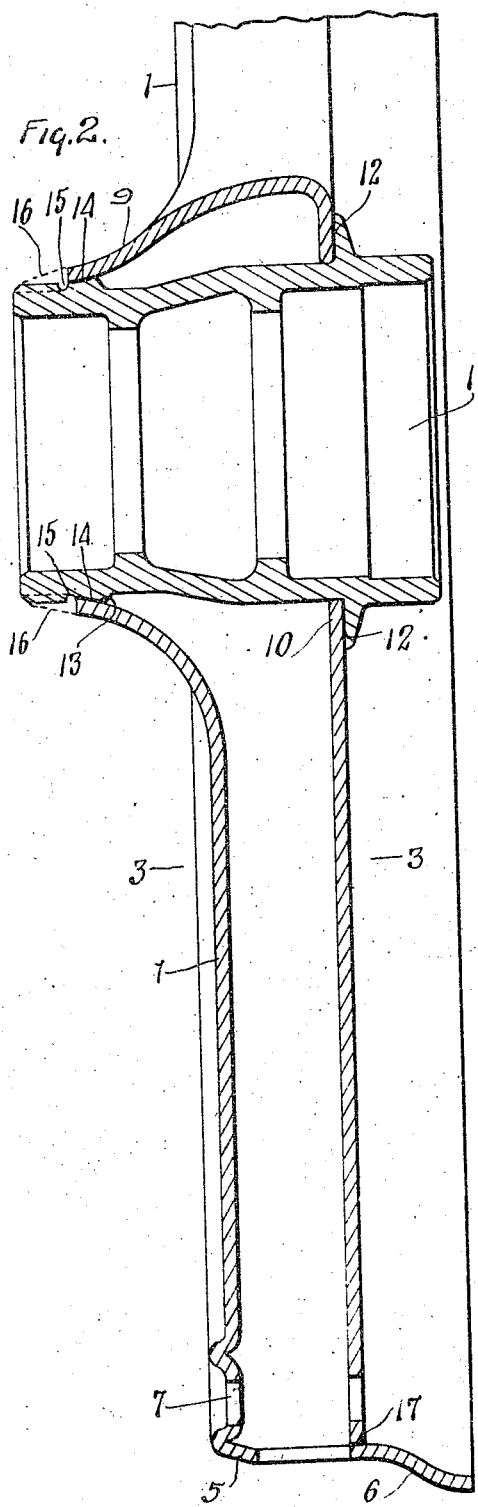
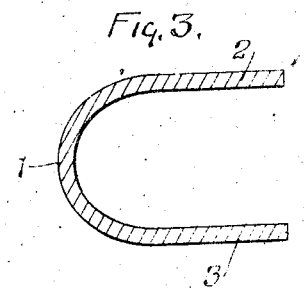
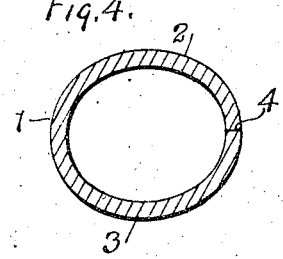
Inventors
George Walther,
Frank H. Walkley,
By Toulmin & Toulmin,
Attorneys

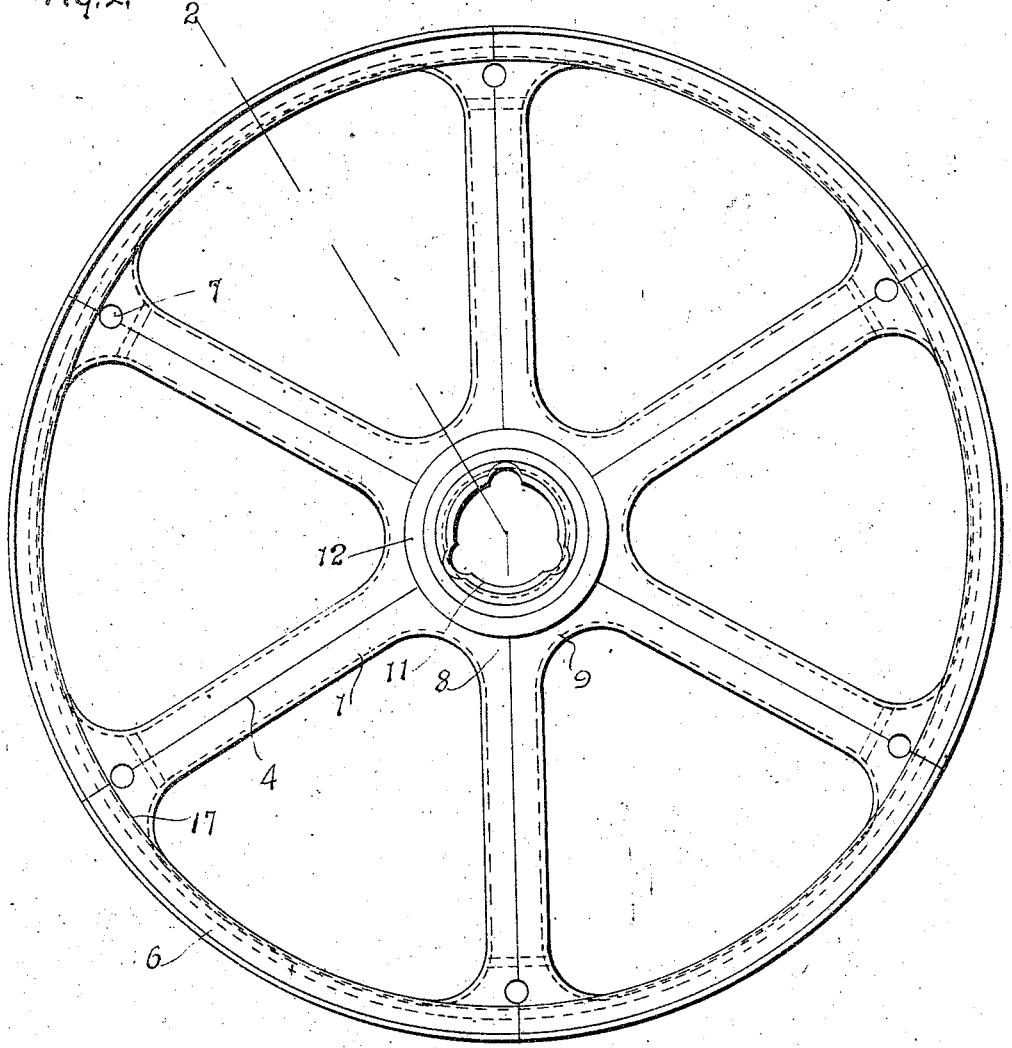

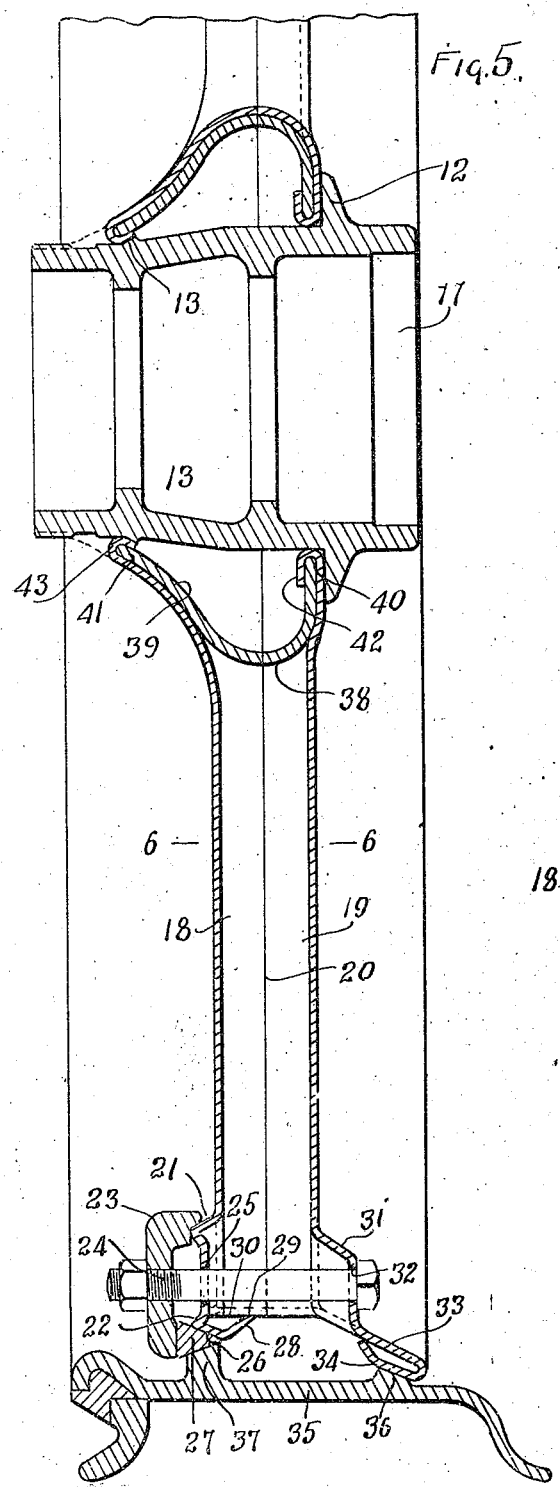
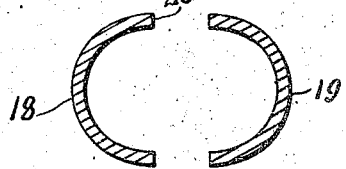
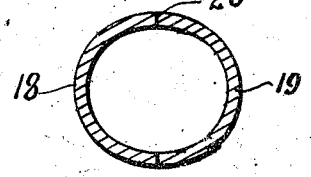

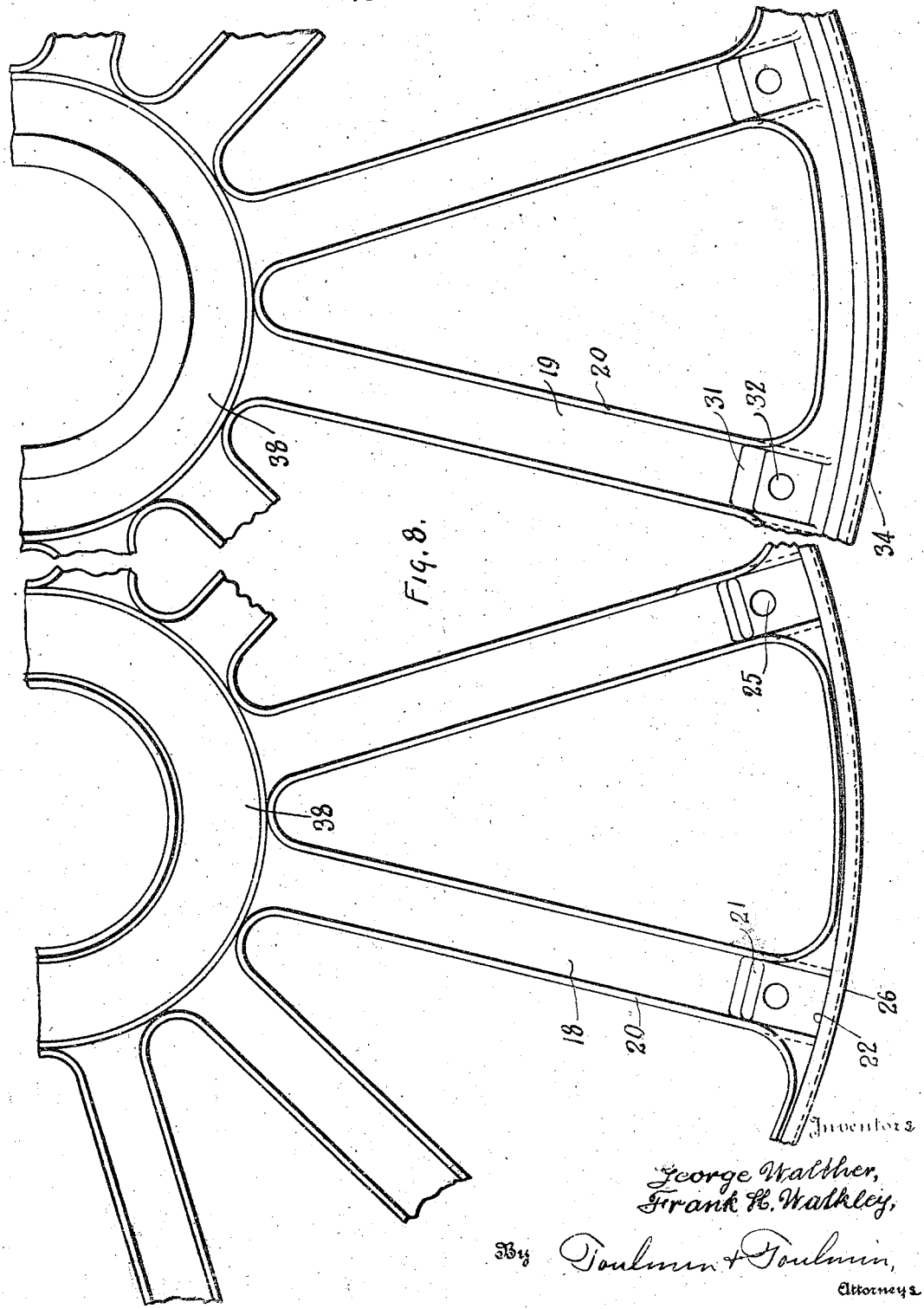

Oct. 12, 1926.  1,602,512
G. WALTHER ET AL
WHEEL
Filed March 19, 1923  5 Sheets-Sheet 5

Inventors
George Walther,
Frank H. Walkley,
By Toulmin & Toulmin,
Attorneys

Patented Oct. 12, 1926.

1,602,512

UNITED STATES PATENT OFFICE.

GEORGE WALTHER AND FRANK H. WALKLEY, OF DAYTON, OHIO, ASSIGNORS TO THE DAYTON STEEL FOUNDRY COMPANY, OF DAYTON, OHIO, A CORPORATION OF OHIO.

WHEEL.

Application filed March 19, 1923. Serial No. 625,962.

Our invention relates to wheels, and in particular to pressed steel wheels.

The object of our invention is to provide a pressed steel wheel having a pressed steel rim and spoke with a hub attached to and locked in the spoke portions.

It is a further object of our invention to provide a wheel which may be readily produced of pressed steel which will have all the rigidity and strength of a cast steel wheel but will not have the weight of a cast steel wheel.

It is an additional object to provide such a wheel which may be produced in parts of standard sizes and afterwards assembled in such a manner that the several parts will interlock and form a rigid structure.

Referring to the drawings, Figure 1 is an elevation of one form of our wheel in which the spoke and rim portions is of one piece.

Fig. 2 is a section on the line 2—2 of Fig. 1.

Fig. 3 is a section on the line 3—3 of Fig. 2

Fig 4 is a section of a spoke taken on the same line when completed.

Fig. 5 is a section through a wheel having its spoke and rim portions composed of two parts and adapted to be joined together to form a single unitary structure.

Fig. 6 is a section on the line 6—6 of Fig. 5 showing the two halves of a spoke about to be joined.

Fig. 7 is a similar section showing the halves joined.

Fig. 8 is a view of the respective halves of the wheel shown in Fig. 5 viewed from the interior of the halves.

Figure 9:
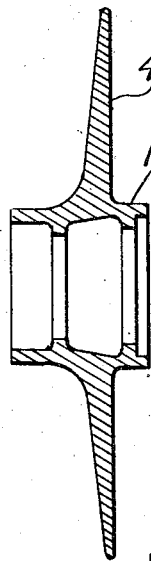
Fig. 9 illustrates a metal blank from which is formed the expanded metal blank shown in Fig. 10 which constitutes eventually one-half of a wheel.

Referring to the drawings in detail:

It is our plan to provide a pressed metal wheel with a cast steel hub.

In the form shown in Figs. 1, 2, 3, and 4 we take a single blank of metal of disked shape. We then blank areas between the spokes to be formed and the rim and also blank a central portion which will later receive the hub.

After these blanking operations we bend the periphery of the blank to form the rim for supporting a demountable rim and tire, form the spokes into tubular members and form the hub portion on the blank for the reception of the cast steel hub.

With this general understanding of the steps of our method of forming such a wheel the construction will be understood from the following description.

1 refers to a spoke which has free ends 2 and 3 joined as at 4. These tubular spokes thus formed terminate at their outer ends in a rim portion 5 which has an inwardly extending and upwardly projecting flange 6. The outer ends of the spokes have apertures therein designated 7 for receiving the retaining bolts which are utilized to retain the demountable rim on the wheel.

The inner ends of the spokes are flared as at 8 on the outer portions of the spokes there being a curved portion 9 provided between the inner ends of the spokes. The rear of the inner end of the spokes as at 10 is straight to form an abutment for a shoulder on the hub, the purpose of which will be hereinafter described.

A hub 11 of cast metal such as steel is inserted in the hub aperture. This hub is provided with an annular flange or shoulder 12 which abuts against the outside of the rear inner portions of the spokes as at 10, thus limiting the movement of the hub relative to the spokes in one direction. The hub is also provided with a shoulder 13 having a tapering face 14. This taper is inwardly and upwardly and thus forms a surface to engage with the tapering ends 8 of the spokes. A groove 15 is provided adjacent this shoulder 13 so that the metal used in effecting a welding joint between 8 and 13 will have a foothold. The hub is welded to the spokes at points of contact. Metal is used in the course of welding to fill in around the outside of the hub and the ends of the spokes as at 16. Afterwards some of this metal is cut away as well as a portion of the spoke when a thread is cut off the end thereof to receive a threaded hub cap.

The ends of the spokes designated 2 and 3 are also welded where they join as at 4. The point of junction at the rear ends of the spoke with the rim as at 17 is a welded joint.

By having the shoulders on the hub engaging with the spoke portions of the spokes and then welding the hub to the spokes a positive locking connection of rigid character is provided.

Referring to Figs. 5, 6, 7, and 8 which illustrate the two piece wheel, it will be observed that the construction of this wheel is generally similar to that of the wheel just described, but that the wheel is formed of two parts consisting of a front half and a rear half.

The respective halves are formed out of the usual circular blanks in which the spokes have been formed as well as the rim portions together with a portion for receiving a hub. The spokes are formed into a semi-circular shape as in Fig. 6 so that the abutting ends of the respective halves may be joined as in Fig. 7.

18 designates the front half of the spokes while 19 designates the rear halves of the spokes. These halves are joined as at 20 and are welded. The front portion of the spokes is struck-up as at 21 and 22 to form a support for the retaining lugs 23. These retaining lugs are retained in position by the bolt 24 passing through an aperture 25 in the struck-up portion. An angular portion 26 on the outer end of the spoke receives the tapered locking ring 27. This outer end of the spoke is bent inwardly as at 28 to add strength and rigidity to this portion of the structure so that its end 29 rests on the end of the spoke as at 30.

On the rear spoke half 19 is a similar struck-up portion 31 having an aperture 32 for receiving the rear portion of the bolt 24. This struck-up portion is continued outwardly and upwardly as at 33 and bent over upon itself as at 34 to form a tapered support for the demountable rim 35. The demountable rim 35 has its tapered shoulders 36 and 37 resting respectively upon the tapered portions 34 and the tapered ring 27.

In order to secure in a locking arrangement the inner ends of the spoke halves adjacent the hub, a U-shaped member 38 is provided, one portion of which flares at 39. The outer ends 40 and 41 of this U-shaped member are overlapped respectively by the inner ends 42 and 43 of the spoke halves 19 and 18, thus physically locking the two halves to one another. The hub 11 engages the ends 40 by its annular flange or shoulder 12. The hub also engages the ends of the spokes by its shoulder 13. The several parts are welded together as described in connection with the one piece wheel.

Figure 10:
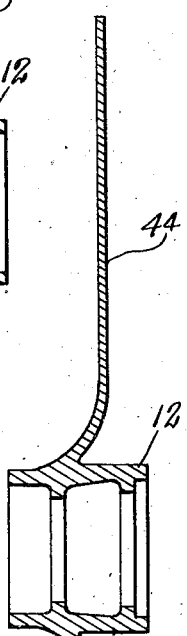
Fig. 10 is a section showing the blank in its expanded form.
Figure 12:
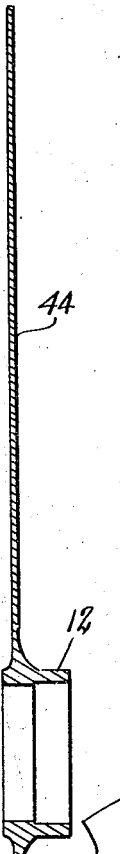
Fig. 12 is a section of the expanded blank formed from the structure shown in Fig. 11.
Figure 11:
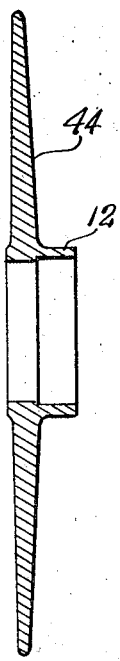
Fig. 11 is a section of a blank from which the other half of the wheel is formed.
Figure 13:
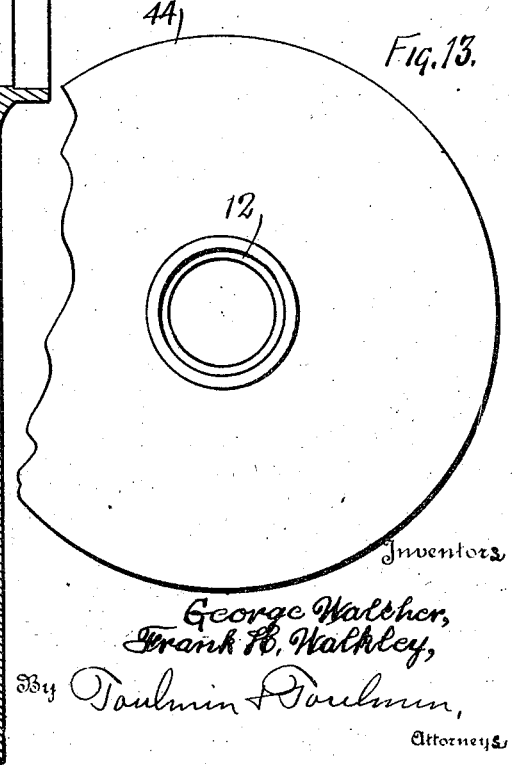
Fig. 13 is a side elevation of the expanded blank as shown in Fig. 12.

Referring to Figs. 9, 10, 11, 12 and 13, Figs. 9 and 11 illustrate the blanks. These blanks consist of a hub portion 12 and spoke portions or plates 44. The portions 44 are flattened to form thin discs as in Figs. 10 and 12. The spokes are then formed as hereinbefore described as well as the rim and the respective halves of hub, spokes and rim joined together by welding or the like, thus forming a complete wheel from two integral blanks.

It will be understood that various modifications may be necessary in this specific configuration of our invention to suit varying conditions, but we comprehend within our invention such necessary modifications.

For instance the hub may be of pressed or drawn metal rather than cast and machined to close limits to receive the axle.

Having thus fully described our invention, what we claim as new and desire to secure by Letters Patent, is:—

1. In a wheel, pressed metal spoke and rim portions joined together, a cast steel hub joined thereto, means on said hub for engaging with the inner ends of the spoke portions, and a portion of the inner ends of said spoke portions flaring outwardly for engagement with one portion of the hub and another portion of said inner spoke ends being adapted to engage with an annular flange on said hub, and an annular flange thereon.

2. In a wheel, a spoke and rim portion consisting of pressed metal halves with their edges joined to one another, an annular connecting member adjacent the inner ends of the spoke portions and engaging therewith, and a separate metal hub portion joined to the inner ends of said spoke portions.

3. In a wheel, a spoke and rim portion consisting of pressed metal halves with their edges joined to one another, an annular connecting member adjacent the inner ends of the spoke portions and engaging therewith, and a separate metal hub portion joined to the inner ends of said spoke portions, and rim portions being adapted on angularly disposed faces to support a demountable rim, and means carried by the outer ends of said spokes for locking said demountable rim on the wheel rim.

4. In a wheel, spoke and rim portions composed of abutting halves of pressed metal, an annular retaining member having the inner ends of the spoke overlapping its free ends, a separate hub having shoulders thereon for engaging with the free ends of said spokes adjacent the retaining member, whereby when the several parts are welded to one another a complete wheel is formed.

5. In a wheel, spoke and rim portions composed of abutting halves of pressed metal, an annular retaining member having the inner ends of the spokes overlapping its free ends, a separate hub having shoulders thereon for engaging with the free ends of said spokes adjacent the retaining member, whereby when the several parts are welded to one another a complete wheel is formed, and struck-up portions on the outer ends of said spokes on either side thereof for supporting rim retaining devices.

6. In a wheel, spoke and rim portions composed of abutting halves of pressed metal, an annular retaining member having the inner ends of the spokes overlapping its free ends, a separate hub having shoulders thereon for engaging with the free ends of said spokes adjacent the retaining member, whereby when the several parts are welded to one another a complete wheel is formed, and struck-up portions on the outer ends of said spokes on either side thereof for supporting rim retaining devices, said outer rim portions being bent over upon themselves to form angularly disposed surfaces for supporting a demountable rim and locking means associated therewith.

7. In a wheel, a pressed metal spoke and rim structure of one piece, said rim portion being bent over upon the spoke portions and the inner ends of the spoke portions having one part thereof outwardly flared and another portion substantially straight for receiving corresponding surfaces on a hub, and a hub joined to the inner ends of said spokes, said hub having flanges thereon for engaging with the free ends of the spokes.

In testimony whereof, we affix our signatures.

GEORGE WALTHER.
FRANK H. WALKLEY.